R. DUSUZEAU.
DOUBLE STEERING AND UNCLUTCHING APPARATUS FOR AVIONS.
APPLICATION FILED NOV. 15, 1917.
1,331,628.
Patented Feb. 24, 1920.
2 SHEETS—SHEET 1.
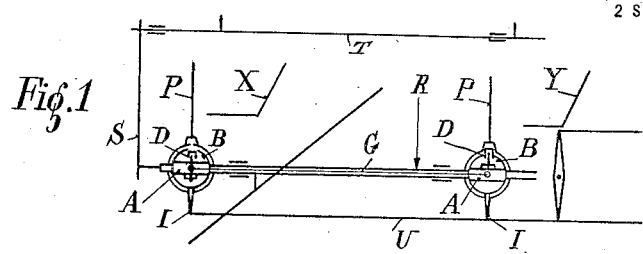
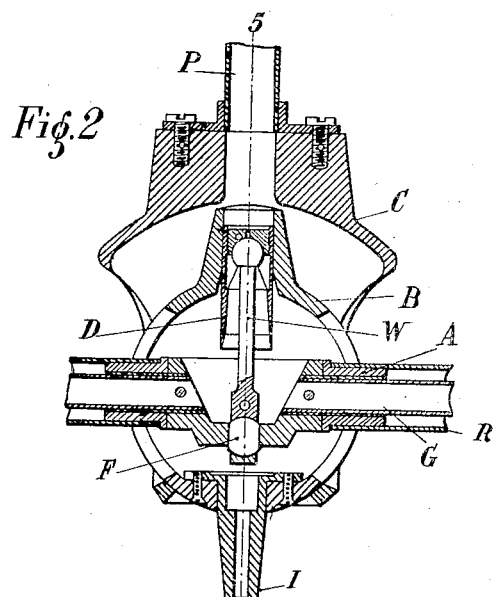
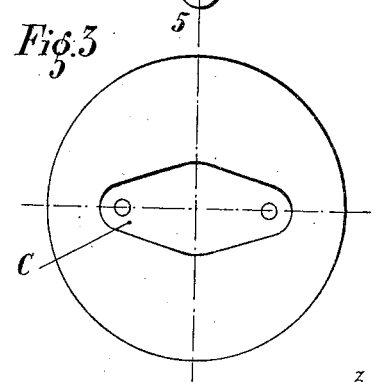
René Dusuzeau,
Inventor
Attorney.

R. DUSUZEAU.
DOUBLE STEERING AND UNCLUTCHING APPARATUS FOR AVIONS.
APPLICATION FILED NOV. 15, 1917.
1,331,628.
Patented Feb. 24, 1920.
2 SHEETS—SHEET 2.
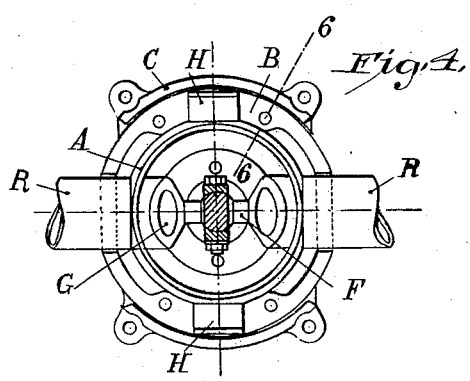
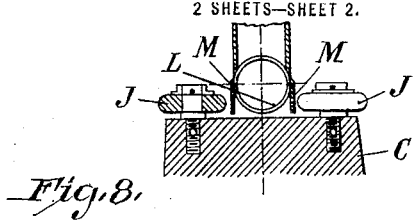
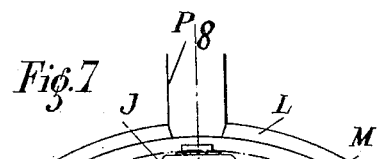
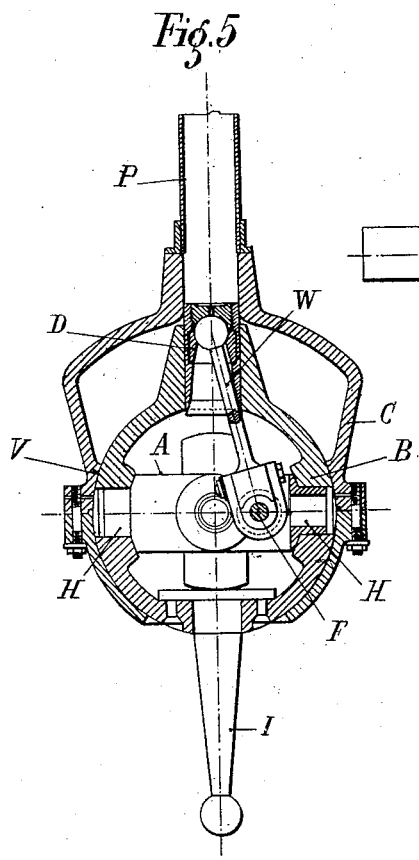
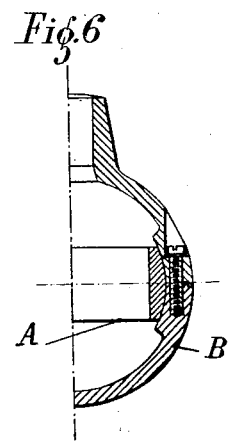
René Dusuzeau
Inventor
Attorney

UNITED STATES PATENT OFFICE.

RENÉ DUSUZEAU, OF BILLANCOURT, FRANCE, ASSIGNOR TO SOCIETE DES MOTEURS, SALMSON (SYSTEME CANTON-UNNE), OF BILLANCOURT, FRANCE.

DOUBLE STEERING AND UNCLUTCHING APPARATUS FOR AVIONS.

1,331,628.  Specification of Letters Patent.  Patented Feb. 24, 1920.

Application filed November 15, 1917. Serial No. 202,152.

*To all whom it may concern:*

Be it known that I, RENÉ DUSUZEAU, citizen of the Republic of France, residing at 3 avenue des Moulineaux, Billancourt, Seine, in the Republic of France, have invented new and useful Improvements in Double Steering and Unclutching Apparatus for Avions, of which the following is a specification.

The object of this invention is an operating apparatus for aeroplanes which allows the pilot and the passenger to separately execute the principal aeroplane steering operations, i. e., vertical steering and wing warping.

Three cases may occur in this connection:
1. The pilot desires to steer alone.
2. Pilot and passenger steer together.
3. The passenger steers alone.

A clutch is used to connect or disconnect the two operating devices for front and rear. This clutch can be operated independently either by the pilot or passenger, and is disposed so that the pilot and passenger can effect the operation of the movements of the apparatus at any moment in the transfer of the control, and thus there is no dead point. This principle is realized by the use of a steering lever combined with a device for direct operation of the parts of the apparatus.

The invention is illustrated in the accompanying drawings which are of a purely explanatory nature.

Figure 1 is a diagram of the ensemble of the double apparatus using a clutch, according to this invention, supposing the operation to be carried out by a lever.

Fig. 2 is a vertical section of one of the two operating devices (for the pilot or for the passenger), this section being made along the longitudinal axis of the aeroplane.

Fig. 3 is a plan view of the outer sphere connected to the operating handle.

Fig. 4 is a plan view of the operating device with the outer sphere supposed to be removed.

Fig. 5 is a vertical section of the operating device upon the line 5—5 of Fig. 2.

Fig. 6 is also a vertical section of the operating device upon the line 6—6 of Fig. 4.

Fig. 7 is a partial sectional elevation of the operating device as used for flywheel steering.

Fig. 8 is a section upon the line 8—8 of Fig. 7.

The warping action is transmitted by a tube R lying along the axis of the apparatus, and the rotation of this tube causes the movement of the ailerons through the countershaft and the operating shaft T (Fig. 1). This tube, or any other member used in its place, is firmly attached to a horizontal spherical ring A, carrying two projections H at 90° from the tube. These projections serve as a pivot center for a hollow sphere B (Figs. 2 to 6) which moves freely from front to back, but which carries with it the spherical ring A when it moves from left to right or vice versa.

When this sphere is moved from front to rear, it can be used if provided with an operating member I, to act directly upon the vertically steering rudder by the use of the cable U, this being effected without operating the warping, vertical slots being provided for a relative displacement of the aileron operating tube R.

On the contrary, this sphere B may, without acting upon the vertically steering rudder, cause the rotation of the warping tube R through the ring A operated by it by means of the side bosses H. The connected parts comprising sphere B and spherical ring A, are adapted to move around the axis of the tube R, and this tube is impelled by such movement so as to rotate in its bearings.

A combination of longitudinal and lateral movements allows of simultaneous operation of the stabilizing device and the ailerons.

A second sphere C is disposed to rotate about the inner sphere, and one part V of the outer surface of this latter sphere serves as a sliding way. The handle P which is attached to C is arranged to secure freedom of operation, by describing a 60° cone, and for this purpose the sphere C carries a set of openings so that when it deviates in any direction by 30° at the maximum from its normal position, it shall not be obstructed either by the warping tube R attached to the spherical ring A, or by the member I attached to the inner sphere B.

The problem in question here is therefore to render at will the inner sphere B (used as a universal joint) solid with the outer sphere C which is on the end of the handle P.

To effect this, the sphere C carries on the extension line of the lever P, a bored out boss. The inner sphere B also carries a bored out boss serving to guide a small piston D, and the movement of the latter causes it to enter the cylinder of the sphere C so as to connect the latter with the sphere B.

The movement can be effected by the use of an eccentric, a rack-and-pinion, or other suitable device.

In the present case there is employed the rotation of a shaft bent at an angle, with a rod W provided with bearings which connect the crank to the piston. The stroke and length of the rod are so designed that upon pushing the handle P to the end position, the piston moves the smallest possible amount, and the head of the rod and the spheres do not rotate about the same point.

The crank of the front apparatus mounted near the pilot and the crank of the rear apparatus mounted near the passenger's seat Y are connected by a tube G which rotates inside the warping tube R. This produces a double-crank shaft whose rods are so adjusted that when the front piston is at the top of its stroke (apparatus in clutch), the rear piston is at its lowest or dead point (apparatus out of clutch). By rotating the connecting tube G through 90°, the front piston descends, but still remains engaged within the sphere C, and the clutch is still on. The rear piston rises and engages in the outer sphere, thus throwing the system in clutch. At this time both the front and rear apparatus are in clutch, the length of the pistons and guide cylinders is calculated so as to have a sufficient length engaged when the two pistons are thus disposed on half-stroke.

By continuing the rotation of G, the front piston is completely released and the rear piston arrives at its dead point, and at this time the rear system is alone in clutch.

In order to fit the piston into the outer sphere, this latter is slowly moved about in all directions, until the hole comes just opposite the piston, and this enters at once. The rotation of the connecting tube G and with it the two cranks is effected by countershaft, and the operating can be carried out by each passenger independently of the other.

The device can be employed with hand wheel steering, as shown in Figs. 7 and 8.

In this case the handle P is only moved from front to back, while the outer sphere C can move in all directions as in the above case. In this way the device is designed so as to allow the sphere C to be moved longitudinally by the handle P, and at the same time this sphere is free to take a lateral movement under the action of the hand wheel. To this end the rod of the hand wheel is mounted upon a vertical frame L, turning about an axis passing through the center of the spherical system. The outer sphere C is free to move parallel to the frame L, and this frame performs the following functions:

1. It guides the sphere in its lateral movements through interposition of the rollers J which roll upon the rolling ways M.

2. It comes against these same rollers, and draws the sphere with it in its longitudinal displacements. In this way a movement of 30° is obtained in all directions with only a forward and back movement of the hand wheel. In this way it is possible to utilize all the members existing in the apparatus working with handle lever. The only modification to be made is to dispose the rollers in place on the bosses which besides can be used in the first method for attachment of the operating lever, and to mount upon the outer sphere the wires which allow of its transverse rotation through the rotation of the flywheel.

Having now described my invention, what I claim as new and desire to secure by Letters Patent is:

1. A controlling apparatus for avions comprising in combination an operating member subject to hand control, a controlling member upon which the operating member is so mounted that it may have a universal movement thereon about one point, means for supporting the controlling member whereby it may itself have a universal movement about the same point, a clutch adapted to operatively connect the controlling member to the operating member and means for operatively connecting the controlling member to controlling surfaces of the flying machine.

2. A double steering apparatus for avions comprising in combination two controlling apparatus each of which comprises a primary member connected to one kind of the controlling planes of a flying machine, a secondary member connected to another kind of controlling planes of the said flying machine, means for operatively connecting the primary member to the secondary member in such a manner that the movement imparted to one of said members has no influence upon the controlling plane connected to the other, an operating member and one clutch adapted to connect the primary member to the corresponding operating member in each apparatus.

3. A double steering apparatus for avions comprising in combination two controlling apparatus each of which comprises a primary member connected to one kind of the controlling planes of a flying machine, a secondary member connected to another kind of controlling planes of the said flying machine, means for operatively connecting the primary member to the secondary member in such a manner that the movement imparted to one of said members has no influence upon the controlling plane connected to the other, an operating member, one clutch adapted to connect the primary member to the corresponding operating member in each apparatus and means operable from either of two distant points for simultaneously causing the clutches to act in reverse directions.

4. A double steering apparatus for avions comprising in combination two controlling apparatus, each comprising a primary member, means connecting the said primary members in both apparatus to controlling planes of a flying machine, a secondary member journaled in each primary member, an actuating member for rigidly connecting the secondary member in one controlling apparatus to the secondary member in the other controlling apparatus, means connecting said actuating member to other controlling planes of the said flying machine, means for rotatably supporting said actuating member whereby the secondary members connected thereto form with the corresponding primary members a universal joint, in each controlling apparatus, operating members freely mounted on the said primary members respectively, and adapted to have a universal movement thereon, means respectively operable from two distant points for actuating the said operating members respectively, two clutches adapted to respectively connect each of the primary members to the corresponding operating member and means operable from either of said distant points for simultaneously causing the clutches to act in reverse directions.

5. A double steering apparatus for avions containing, in combination, two control apparatus, a bell disposed around each control apparatus and provided with a bored hole, means for operating each bell, a clutch piston between each control apparatus and its corresponding bell, a piston rod for each of the two pistons, a crank-shaft connecting the two piston rods, which prevents the simultaneous unclutching of the two pistons, substantially as described and for the purpose set forth.

6. A double steering apparatus for avions, containing, in combination, two control apparatus, each comprising a hollow spherical piece provided with a bored hole on the top, an arm mounted at the bottom of said spherical piece, a spherical ring, two projections disposed upon said ring and journaled in the spherical piece, a clutch piston movable in the bored hole of the spherical piece, and a piston-rod for this piston, a cable for operating the vertically-steering rudders, said cable being attached to the arms of the two controlling apparatus, a tube for wing warping which is attached to the two rings of the two control devices, a crank shaft provided with two crank pins set at an angle, to which the two rods of the clutch pistons are respectively connected, said crank shaft being disposed within said tube, a bell disposed around each control apparatus and provided with a hole whose bore corresponds to that of the piston used for throwing on the clutch, and means for steering provided upon each of said bells, substantially as described and for the purpose set forth.

In testimony whereof I have signed my name to this specification in the presence of two subscribing witneses.

RENÉ DUSUZEAU.

Witnesses:
   Louis Moses,
   Chas. P. Pressly.